(12) United States Patent
Mimura

(10) Patent No.: US 10,587,802 B2
(45) Date of Patent: Mar. 10, 2020

(54) ELECTRONIC DEVICE AND CONTROL METHOD THEREOF

(71) Applicant: CANON KABUSHIKI KAISHA, Tokyo (JP)

(72) Inventor: Daisuke Mimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/898,332

(22) Filed: Feb. 16, 2018

(65) Prior Publication Data

US 2018/0241945 A1  Aug. 23, 2018

(30) Foreign Application Priority Data

Feb. 21, 2017 (JP) ................... 2017-030248
Dec. 21, 2017 (JP) ................... 2017-245394
Jan. 19, 2018 (JP) ................... 2018-007591

(51) Int. Cl.
  *H04N 5/76* (2006.01)
  *H04N 5/232* (2006.01)
  *G06F 9/4401* (2018.01)
  *G06F 1/3296* (2019.01)
  *H04L 12/12* (2006.01)

(52) U.S. Cl.
  CPC ....... *H04N 5/23241* (2013.01); *G06F 1/3296* (2013.01); *G06F 9/4418* (2013.01); *H04N 5/23206* (2013.01); *H04L 12/12* (2013.01)

(58) Field of Classification Search
  CPC ..... H04N 5/23241; G06F 9/4418; G06F 1/32; G06F 1/3203; G06F 3/0625
  See application file for complete search history.

(56) References Cited

U.S. PATENT DOCUMENTS

| 10,268,486 | B1* | 4/2019 | Mitra | ................... G06F 9/4418 |
| 2008/0180564 | A1* | 7/2008 | Yamaji | ................... H04N 5/232 348/372 |
| 2014/0359260 | A1* | 12/2014 | Utsumi | ................ G06F 9/4418 713/1 |
| 2016/0216901 | A1* | 7/2016 | Takeshita | .............. G06F 3/0688 |
| 2017/0180582 | A1* | 6/2017 | Kodama | ............ H04N 1/00891 |
| 2018/0013910 | A1* | 1/2018 | Hashimoto | ........ H04N 1/00891 |

FOREIGN PATENT DOCUMENTS

JP  2012-252576 A  12/2012

* cited by examiner

*Primary Examiner* — Kelly L Jerabek
(74) *Attorney, Agent, or Firm* — Cowan, Liebowitz & Latman, P.C.

(57) ABSTRACT

In response to the input of a startup instruction being detected, an electronic device executes a first startup process using hibernation data including information for restoring a status of the electronic device to a status at a time when the electronic device was in operation. The electronic device then executes the first startup process using a combination of a plurality of pieces of hibernation data necessary to restore the electronic device to a status of providing a specific function associated with the startup instruction.

11 Claims, 15 Drawing Sheets

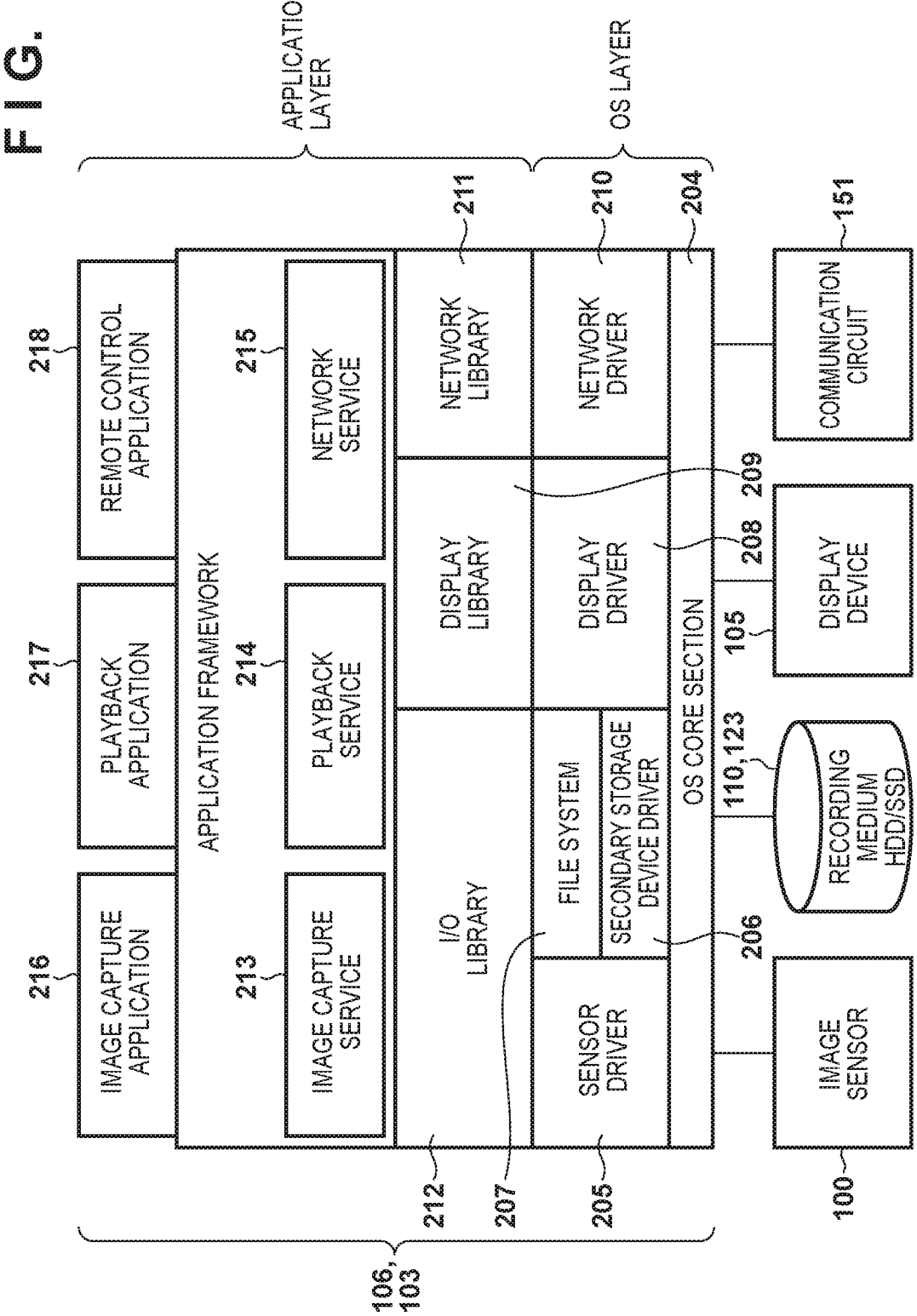

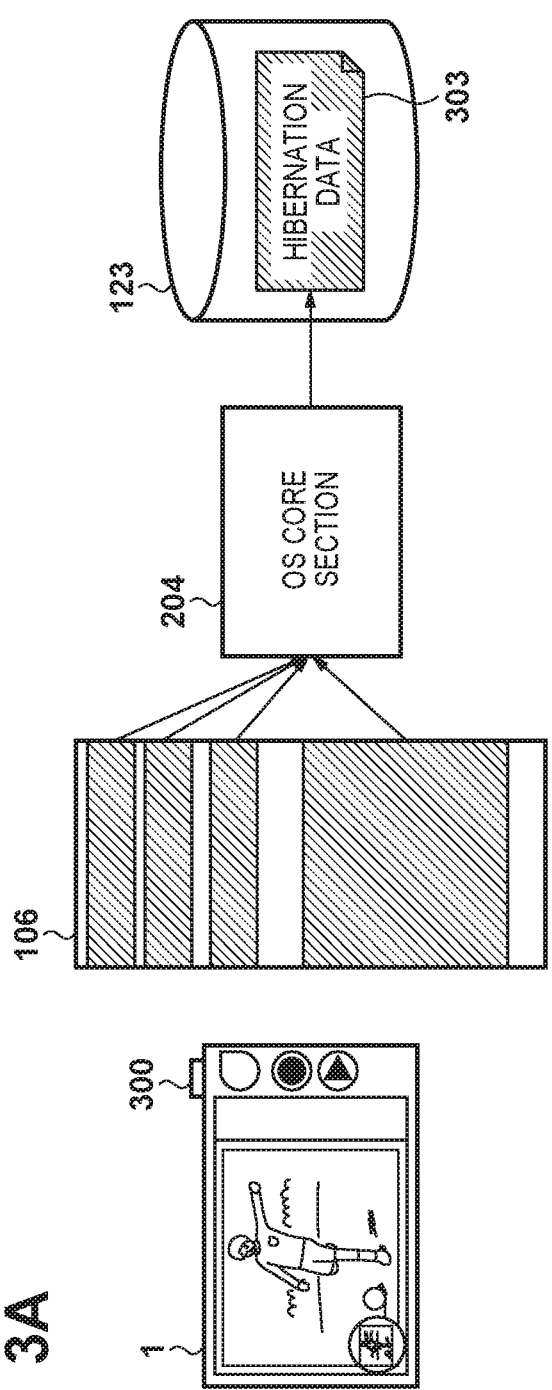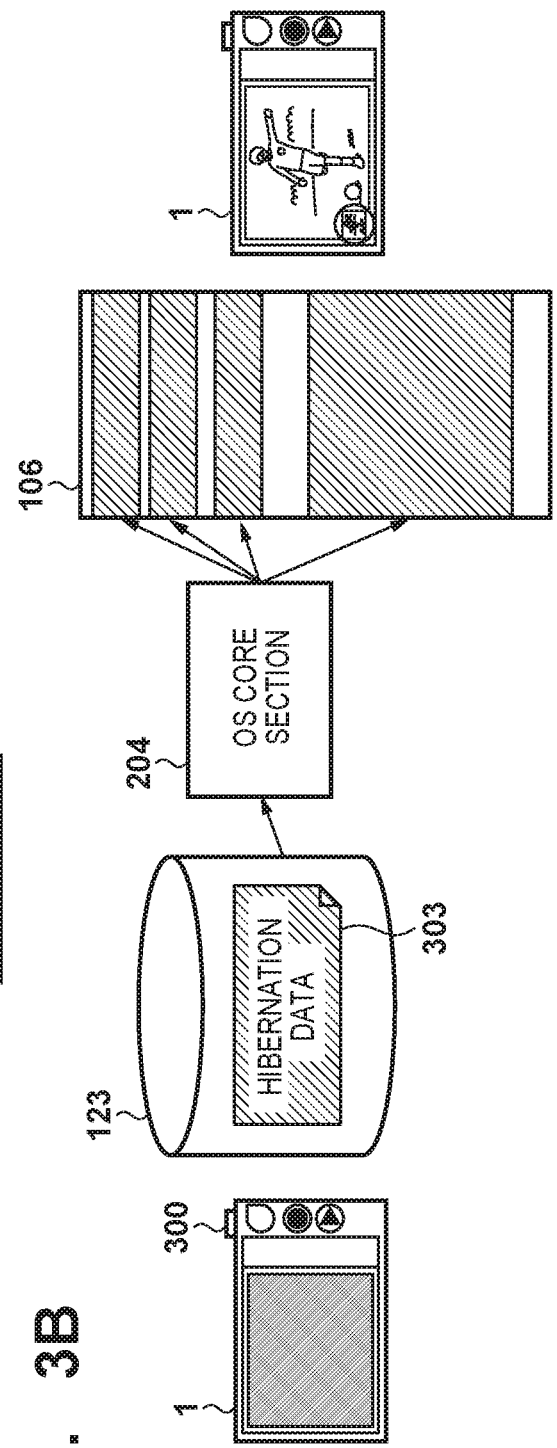

FIG. 10
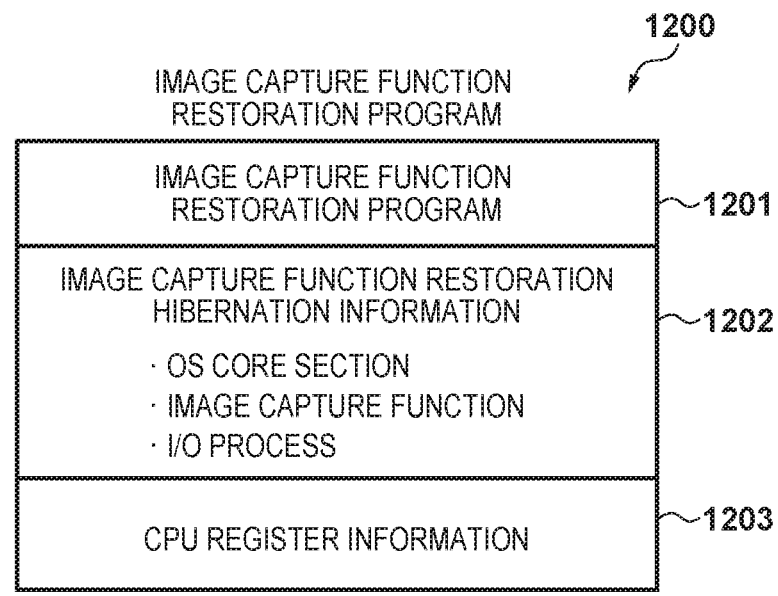
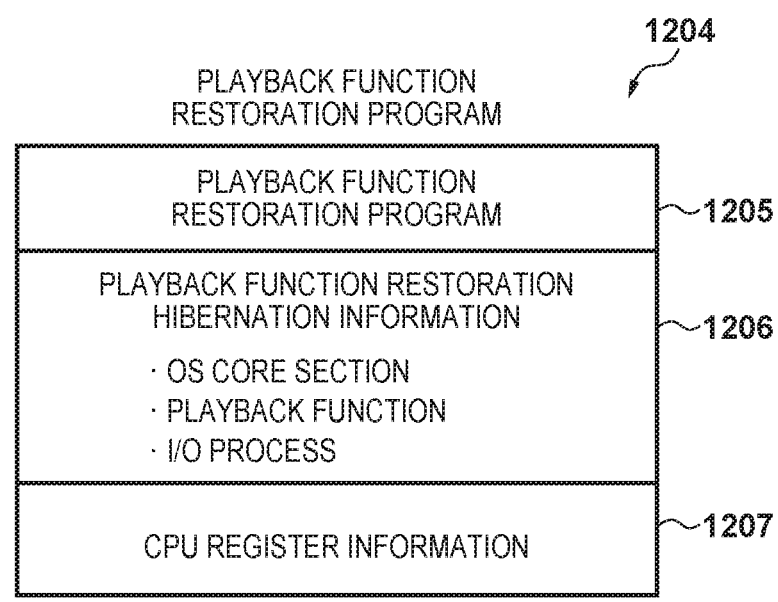

F I G. 15
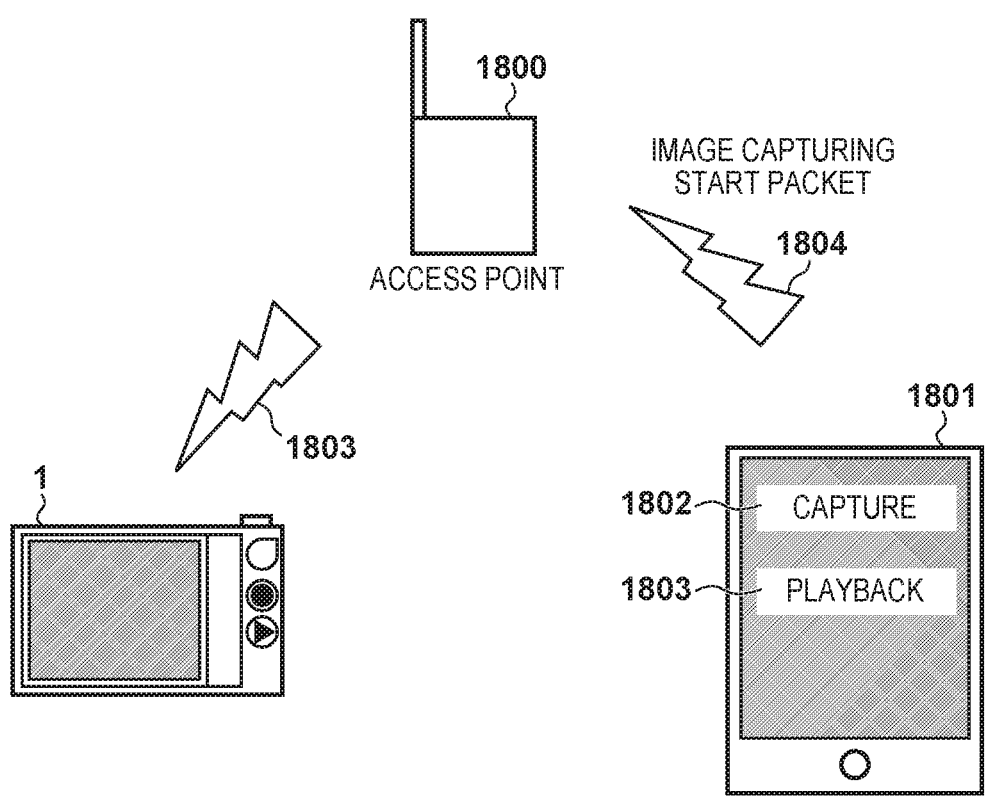

ELECTRONIC DEVICE AND CONTROL METHOD THEREOF

BACKGROUND OF THE INVENTION

Field of the Invention

This invention relates to an electronic device and a control method thereof; and particularly relates to techniques for speeding up startup time.

Description of the Related Art

In electronic devices that use computers, "hibernation" is known as a technique for reducing power consumption and shortening startup times.

Hibernation is a technique in which, when putting an electronic device into a suspended state, hibernation data containing information (memory content, register values, and so on) for restoring the status of the electronic device to a status at a time when the electronic device was in operation (typically at a time immediately before entering the suspended state) is generated and stored in a non-volatile storage device such as a hard disk. When returning from the suspended state, the status of electronic device that was immediately before the electronic device entered the suspended state can be resumed by restoring the content of the hibernation data. The electronic device can be turned off while in the suspended state, and thus the power consumption can be reduced. It also takes less time to resume from the suspended state than when starting up normally (Japanese Patent Laid-Open No. 2012-252576).

According to Japanese Patent Laid-Open No. 2012-252576, when returning from hibernation using the kernel function of the OS, the hibernation data is preloaded in parallel with the initialization of the kernel in order to shorten the startup time. However, even if a user wishes to use a different function from the functions (applications) s/he was using before entering the suspended state, the user must wait until the hibernation data for enabling all of the functions being used before entering the suspended state has been completely restored. It has thus taken a long time before the user can use his/her desired functions.

SUMMARY OF THE INVENTION

This invention at least reduces such problems with the related art, and provides an electronic device, and a control method thereof, that can speed up startup that uses hibernation data expressing the status of the electronic device memory and hardware.

According to an aspect of the present invention, there is provided an electronic device comprising: a storage unit that stores hibernation data including information for restoring a status of the electronic device at a time when the electronic device was in operation; and a control unit configured to execute a first startup process using the hibernation data in response to an input of a startup instruction being detected, wherein the storage unit stores a plurality of pieces of hibernation data that can be used in combination with each other; and the control unit executes the first startup process using a combination of a plurality of pieces of hibernation data necessary to restore the electronic device to a status of providing a specific function associated with the startup instruction.

According to another aspect of the present invention, there is provided a method of controlling an electronic device, the electronic device including a storage unit that stores a plurality pieces of hibernation data, each of which including information for restoring a status of the electronic device at a time when the electronic device was in operation, the method comprising: executing a first startup process using one or more pieces of the hibernation data in response to an input of a startup instruction being detected, wherein the plurality of pieces of hibernation data can be used in different combinations; and in the executing, the first startup process is executed using a combination of a plurality of pieces of the hibernation data that are necessary to restore the electronic device to a status of providing a specific function associated with the startup instruction.

According to a further aspect of the present invention, there is provided a non-transitory computer-readable medium storing a program that causes, when executed by a computer included in an electronic device that has a storage unit storing a plurality pieces of hibernation data, each of which including information for restoring a status of the electronic device at a time when the electronic device was in operation, the computer to perform a method comprising: executing a first startup process using one or more pieces of the hibernation data in response to an input of a startup instruction being detected, wherein the plurality of pieces of hibernation data can be used in different combinations; and in the executing, the first startup process is executed using a combination of a plurality of pieces of the hibernation data that are necessary to restore the electronic device to a status of providing a specific function associated with the startup instruction.

Further features of the present invention will become apparent from the following description of exemplary embodiments with reference to the attached drawings.

BRIEF DESCRIPTION OF THE DRAWINGS

FIG. 2 is a schematic diagram illustrating an example of a software configuration according to the embodiment.

FIGS. 3A and 3B are schematic diagrams illustrating an overview of hibernation data generation and a startup process using the hibernation data.

FIG. 10 is a diagram illustrating an example of the data structure of a function restoration program.

FIG. 15 is a schematic diagram illustrating an overview of a system according to a variation on the embodiment.

DESCRIPTION OF THE EMBODIMENTS

Exemplary embodiments of the present invention will now be described in detail in accordance with the accompanying drawings. Although the following describes an embodiment in which the invention is applied in a digital camera (an image capture apparatus 1), the invention can be applied in any electronic device that uses a programmable processor. The "electronic device" includes smartphones, personal computers, tablet terminals, game consoles, and the like in addition to image capture apparatuses, but is not limited thereto.

Figure 1:
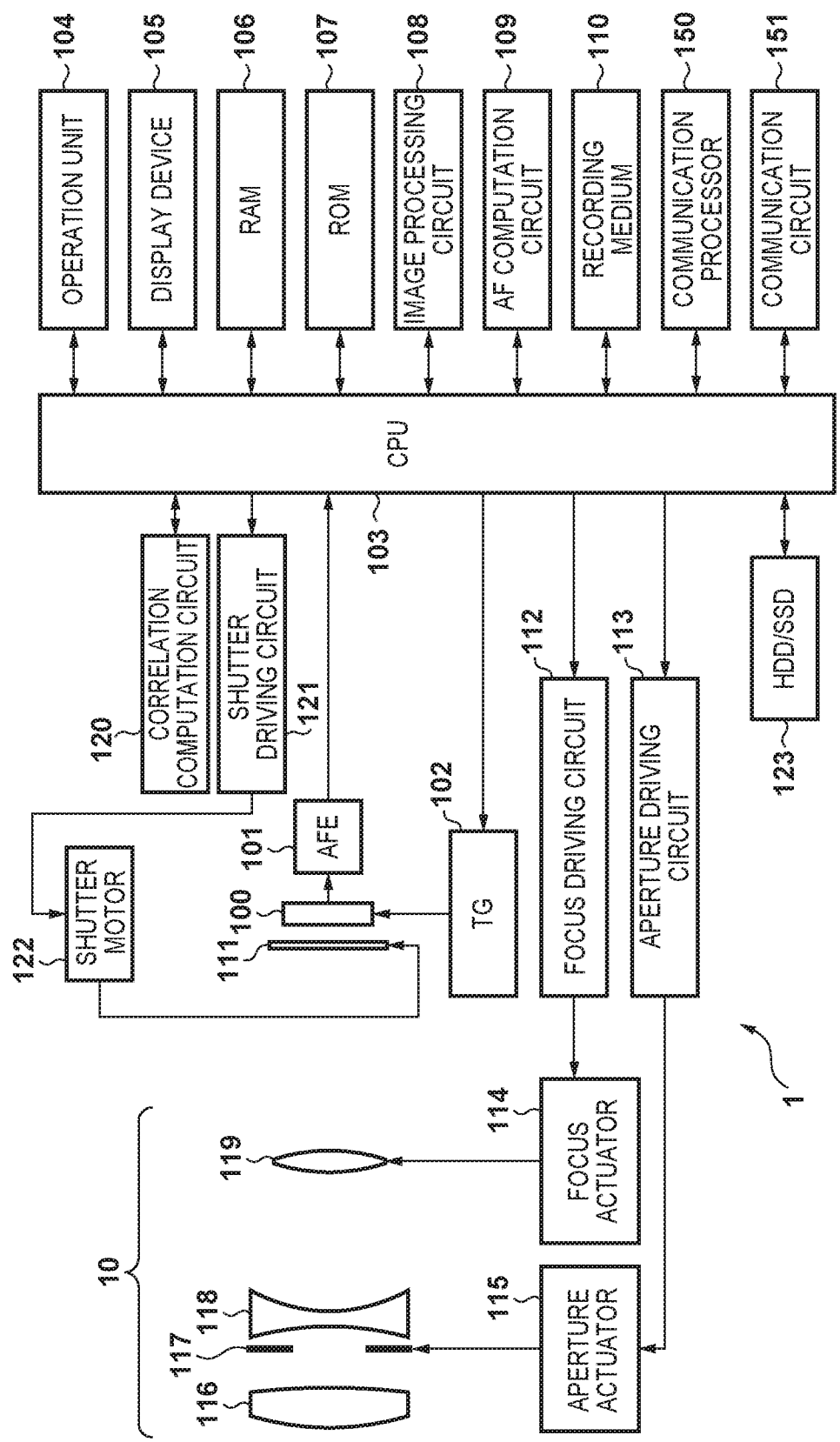
FIG. 1 is a diagram illustrating an example of the configuration of an image capture apparatus serving as an example of an electronic device according to an embodiment.

FIG. 1 is a block diagram illustrating an example of the functional configuration of the image capture apparatus 1 according to an embodiment of the invention. Function blocks denoted as "circuits" in FIG. 1 may be constituted of independent pieces of hardware (ASICs, ASSPs, or the like), or a plurality of function blocks may be constituted of a single piece of hardware. An image sensor 100 is a CCD or a CMOS image sensor, for example, and photoelectrically converts an optical image of a subject formed by an optical imaging system 10 into an electrical signal. As will be described later, the image sensor 100 includes a plurality of pixels in a two-dimensional array, and is configured such that each pixel can be used both as an imaging pixel and as a focusing pixel. A pixel will be called an "imaging pixel" or a "focusing pixel" hereinafter depending on that pixel's usage.

Operations of the image sensor 100 (charge accumulation, resetting, readout, and so on) are controlled by various types of signals generated by a timing generator (TG) 102 under the control of a central processing unit (CPU) 103, which is one example of a programmable processor. An analog front-end (AFE) 101 carries out gain adjustment, A/D conversion, and so on an analog image signal read out from the image sensor 100. The TG 102 controls operations of the image sensor 100 and the AFE 101 under the control of the CPU 103. Although FIG. 1 illustrates the AFE 101 and the TG 102 as being configured separate from the image sensor 100, these elements may instead be built into the image sensor 100.

As described above, the CPU 103 controls the various elements of the image capture apparatus 1 and implements the functions of the image capture apparatus 1 by loading programs (including an OS and application programs) stored in ROM 107, for example, into RAM 106, which is a primary storage device, and executing those programs. The OS used in the image capture apparatus 1 according to this embodiment is a multitasking OS. Note that at least some of the function blocks described below as circuits may be implemented by the CPU 103 executing programs rather than being implemented by hardware such as ASICs or ASSPs.

An operation unit 104 is a group of input devices such as a touch panel, keys, and buttons, and is used by a user to input instructions, parameters, and so on into the image capture apparatus 1. The operation unit 104 includes a shutter button, a power switch, a directional key, a menu button, a set button, an image capture mode dial, a playback button, a moving image capture button, and so on, but these are merely examples. The touch panel may be incorporated into a display device 105. The CPU 103 monitors the operation unit 104, and upon detecting an operation made through the operation unit 104, performs operations in accordance with the detected operation.

The display device 105 displays captured images (still images, moving images, and so on), menu screens, setting values and statuses of the image capture apparatus 1, and so on under the control of the CPU 103.

The RAM 106 is used to store image data output by the AFE 101, to store image data processed by an image processing circuit 108, as a work memory for the CPU 103, and so on. The RAM 106 is also called "system memory". Although constituted of DRAM in this embodiment, the RAM 106 is not limited thereto.

The ROM 107 stores programs executed by the CPU 103, various types of setting values, GUI data, and the like. The ROM 107 may be at least partially rewritable.

The image processing circuit 108 carries out various types of image processing on the image data. The image processing includes processes pertaining to the recording and playback of captured images, such as demosaicing, white balance adjustment, optical distortion correction, tone correction, encoding, and decoding. The image processing also includes processes pertaining to the control of image capture operations, such as calculating evaluation values for contrast-based AF, generating image signals for image plane phase difference-based AF, generating brightness evaluation values for AE, subject detection, and motion vector detection. The types of image processing mentioned here are merely examples, and do not absolutely need to be carried out. Of course, other image processing may be executed as well.

A correlation computation circuit 120 carries out correlation computations on the image signals for image plane phase difference-based AF generated by the image processing circuit 108, and calculates a phase difference (magnitude and direction) between the image signals.

An AF computation circuit 109 calculates a driving direction and driving amount of a focus lens 119 on the basis of a result of the correlation computation output from the correlation computation circuit 120. A recording medium 110 is used in the case where image data that has been captured is recorded in the image capture apparatus 1. The recording medium 110 may be a removable memory card and/or built-in memory, for example.

A shutter 111 is a mechanical shutter for adjusting an exposure time of the image sensor 100 when capturing a still image, and is opened/closed by a motor 122. The CPU 103 controls the opening/closing of the motor 122 through a shutter driving circuit 121. Note that instead of a mechanical shutter, the charge accumulation time of the image sensor 100 may be adjusted by a signal supplied by the TG 102 (an electronic shutter).

A focus driving circuit 112 changes the focal distance of an imaging optical system by driving a focus actuator 114 to move the focus lens 119 in an optical axis direction. When performing image plane phase difference-based AF, the focus actuator 114 is driven on the basis of the driving direction and driving amount of the focus lens 119 calculated by the AF computation circuit 109.

An aperture driving circuit 113 changes the diameter of an aperture 117 by driving an aperture actuator 115. A first lens 116 is arranged at a leading end of the imaging optical system, and is held so as to be capable of extending/retracting in the optical axis direction. The aperture 117 and a second lens 118 extend/retract together in the optical axis direction in tandem with the extending/retracting operations of the first lens 116 so as to realize a magnification effect (a zoom function).

A hard disk drive (HDD)/solid-state drive (SSD) 123 is a secondary storage device. Note that the secondary storage device is not limited to an HDD or an SSD, and any non-volatile storage device can be used. Note that the ROM 107 and the HDD/SSD 123 may actually be implemented as separate regions of the same storage device.

A communication circuit 151 is assumed here to be a wireless communication circuit capable of connecting to a wireless network such as a wireless LAN or a public wireless telephone network. However, the communication circuit 151 may be a wired communication circuit, or may include both a wired communication circuit and a wireless communication circuit. The operations of the communication circuit 151 are controlled by the CPU 103, or by a communication processor 150 provided if necessary.

Note that the communication processor 150 can operate independent from the CPU 103. Standby power is supplied to the communication processor 150 and the communication circuit 151 even when the image capture apparatus 1 is powered off, and thus packets sent to the image capture apparatus 1 from an external network can be received. The communication processor 150 can also generate events for powering on the image capture apparatus 1, execute program stored in the ROM 107, and so on.

Note that the CPU 103 and the blocks connected to the CPU 103 are communicatively connected by a common system bus. Operations denoted in the following descriptions as being carried out by software such as programs are actually realized by the CPU 103 executing that software.

FIG. 2 is a diagram schematically illustrating the software configuration of the image capture apparatus 1 along with some of the hardware illustrated in FIG. 1.

The software has an OS layer and an application layer, is loaded from the ROM 107 into the RAM 106 when the image capture apparatus 1 is in operation, and is executed by the CPU 103. The OS layer includes an OS core section (kernel) 204, hardware drivers (device drivers) 205, 206, 208, and 210, and a file system 207 of the secondary storage device (HDD/SSD 123). The OS core section 204 carries out necessary processes for the OS, such as controlling the RAM 106, controlling tasks, and controlling the CPU 103.

For the sake of simplicity, FIG. 2 only illustrates some of the hardware and device drivers of the image capture apparatus 1. In actuality, other hardware (e.g. input devices included in the operation unit 104) and device drivers for that hardware are also included.

The application layer includes various libraries, application frameworks, and application programs. Applications in the top layer provide the functions of the image capture apparatus 1. An image capture application 216 provides an image capture function. A playback application 217 provides a function for playing back image data recorded in the recording medium 110 and/or the HDD/SSD 123 and displaying the image data in the display device 105. A remote control application 218 provides a function for controlling the operations of the image capture apparatus 1 from the exterior via the communication circuit 151.

An image capture service 213, a playback service 214, and a network service 215 are present in the layer below the applications as an application framework. These services are middleware that carry out device control and the like for the applications to provide their functions.

An I/O library 212, a display library 209, and a network library 211 are present in the layer below the application framework as interface libraries for the services to access the devices. These interface libraries include application programming interfaces (APIs) for calling applications and services.

Note that the application programs, services, and libraries illustrated in FIG. 2 are merely examples, and application programs that implement other functions, as well as the services and libraries corresponding thereto, may be included as well.

FIG. 3A is a diagram schematically illustrating an example of the status of the RAM 106, and hibernation operations, while the image capture apparatus 1 is in a capture standby state.

The image capture apparatus 1 enters the capture standby state when the power is turned on using a power switch 300 in the operation unit 104. In the capture standby state, startup sequences for the OS core section 204, a sensor driver 205, a secondary storage device driver 206, the file system 207, the image capture service 213, and the image capture application 216 are completed, and the image capture apparatus 1 is thus in a state of being able to respond to a capture instruction. The capture instruction is input by the shutter button of the operation unit 104 being depressed, for example.

Furthermore, startup sequences for the playback application 217, the playback service 214, the remote control application 218, the network service 215, and so on are also completed. The image capture apparatus 1 enters a state in which functions corresponding to various operations made through the operation unit 104 can be provided as a result. FIG. 3A schematically illustrates a state in which the startup sequences for all applications and services are complete and the applications and services are loaded in the RAM 106.

While in the capture standby state, program data, numerical data, and so on of the applications and services are written into the RAM 106, and the OS core section 204 (the CPU 103) recognizes the program data and numerical data written into the RAM 106. If the startup of the OS is to be sped up using data ("hibernation data" hereinafter) holding information for restoring the status while the electronic device was in operation (data loaded into the memory, register values, and so on), it is necessary to generate the hibernation data. For example, when the image capture apparatus 1 enters a suspended state, a hibernation function can generate hibernation data 303 from the program data, numerical data, and so on written into the RAM 106. Note that the OS core section 204 typically includes the hibernation function, and thus for the sake of simplicity, FIGS. 3A and 3B and the following descriptions indicate the hibernation function as being implemented by the OS core section 204.

The OS core section 204 stores the generated hibernation data 303 in the secondary storage device (the HDD/SSD 123) and turns the image capture apparatus 1 off. Note that the hibernation data 303 may be generated at a timing aside from when the image capture apparatus 1 transitions to the suspended state. As such, the image capture apparatus 1 need not transition to the suspended state in response to the hibernation data 303 being generated.

In this state, when a startup instruction is issued in response to the power switch 300 being depressed or the like, the OS core section 204 reloads the hibernation data 303 stored in the HDD/SSD 123 when the startup sequence was processed in the RAM 106 (this will be described later). It is thus possible to return to the state in the RAM 106 that was present during the capture standby state without completely redoing the startup sequences for the applications and services, which makes it possible to shorten the startup time.

Figure 4:
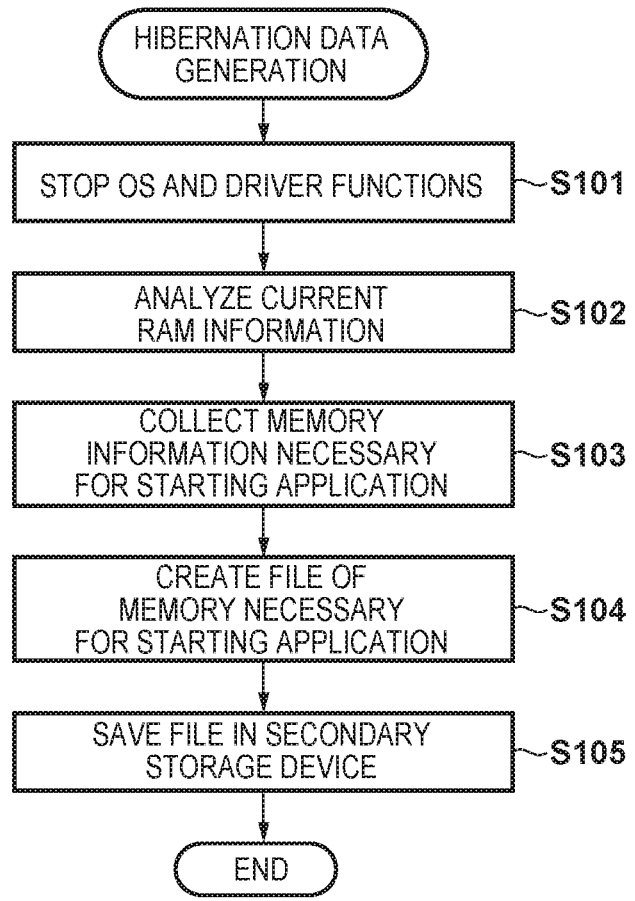
FIG. 4 is a flowchart illustrating an overview of a hibernation data generation process.

FIG. 4 is a flowchart illustrating a sequence by which the OS core section 204 generates the hibernation data 303. The generation of the hibernation data 303 is started in response to the OS core section 204 of the image capture apparatus 1 receiving, as an inputted command, a command to start generating the hibernation data, in response to an event for transitioning to a power saving mode, or the like.

First, the OS core section 204 stops OS functions, driver functions, and so on so that the state of the RAM 106 does not change while the hibernation data 303 is being generated (S101). Next, the OS core section 204 analyzes the state of the RAM 106 (S102). The OS core section 204 then collects the contents of a region determined by the analysis to be a currently-used region (a region containing information necessary to start up the applications) (S103), and generates a single piece of hibernation data.

Figure 5:
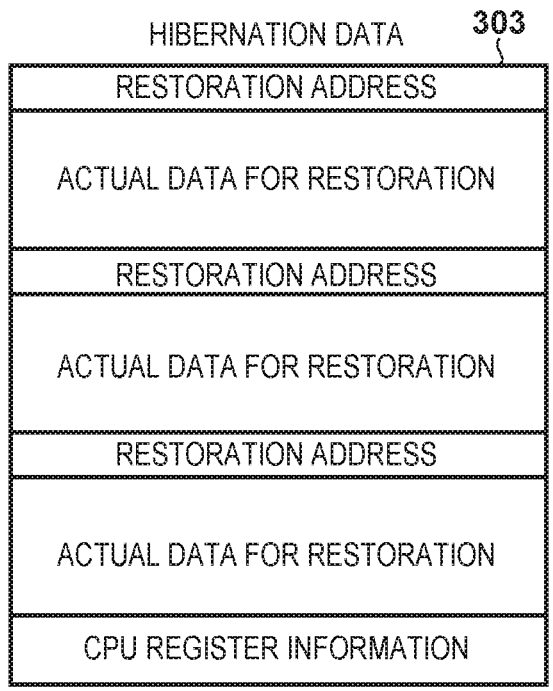
FIG. 5 is a diagram illustrating an example of the structure of hibernation data.

FIG. 5 illustrates an example of the structure of the hibernation data 303. In the hibernation data 303, actual data for restoration (a copy of data, programs, and so on loaded in the memory) and restoration addresses (locations within the RAM 106) are held in association with each other for each region being used by the RAM 106. Register values of the CPU 103 are also held in the hibernation data 303 as CPU register information.

The OS core section 204 saves the generated hibernation data as a data file in the secondary storage device (the HDD/SSD 123) (S105). The OS core section 204 may then restart the OS functions and driver functions stopped in S101, or may turn the power of the image capture apparatus 1 off.

Figure 6:
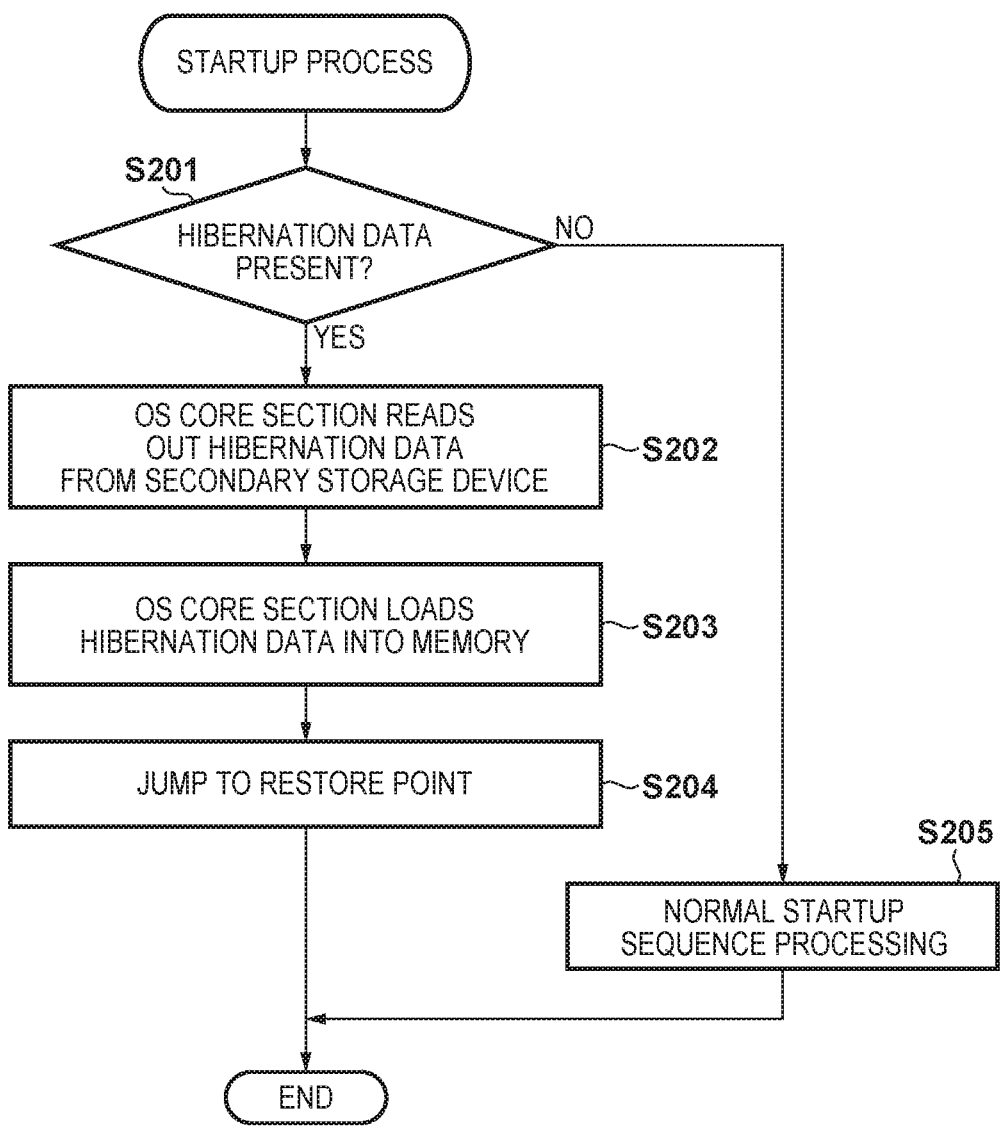
FIG. 6 is a flowchart illustrating an overview of a startup process.

Next, startup processing operations of the image capture apparatus 1 will be described using the schematic diagram illustrated in FIG. 3B and the flowchart illustrated in FIG. 6.

When, while the image capture apparatus 1 is powered off (or is in a suspended state), a startup instruction is issued in response to the power switch 300 being depressed or the like, a BIOS launches a boot loader (that is, the CPU 103 executes the boot loader).

In S201, the boot loader checks whether or not the hibernation data 303 is present in a prescribed location of the HDD/SSD 123, advancing the processing to S202 if the hibernation data 303 is present and to S205 if the hibernation data 303 is not present.

In S205, the boot loader loads the OS core section 204 into the RAM 106 and executes the OS core section 204. The OS core section 204 executes a normal startup sequence of processes such as loading the device drivers and initializing the devices, and then ends the startup process. S205 corresponds to normal startup operations that do not use the hibernation data 303.

In S202, the boot loader reads out the hibernation data 303 from the HDD/SSD 123.

In S203, the boot loader loads the actual data for restoration contained in the read-out hibernation data 303 into the RAM 106 in accordance with the restoration addresses associated therewith, and restores the contents of the RAM 106 to the state present when the hibernation data 303 was generated. Additionally, the boot loader changes internal information of the CPU 103 on the basis of the CPU register information denoted in the hibernation data 303, and thus also restores the CPU 103 to the state present when the hibernation data 303 was generated. The boot loader then starts the OS core section 204 from a restore point (that is, calls a resume function of the OS core section 204), and ends the startup process.

By starting up using the hibernation data, the OS core section 204 need not load the device drivers, carry out various types of initialization processes, and so on performed in a normal startup process, which makes it possible to shorten the startup time.

The software configurations while the image capture apparatus 1 illustrated in FIG. 2 is in operation can be grouped by focusing on the functions provided by the image capture apparatus 1.

For example, the image capture application 216, the image capture service 213, the I/O library 212, and the sensor driver 205 are necessary in order to provide an image capture function. The file system 207 and the secondary storage device driver 206 are necessary in order to save the image data obtained by image capturing in the recording medium 110. The OS core section 204, which provides basic functions as an OS, such as task management and timer management, is also necessary.

The playback application 217 and the playback service 214 are necessary to provide a playback function. The I/O library 212, the file system 207, and the secondary storage device driver 206 are necessary in order to read out the image data to be played back. Furthermore, the display library 209 and a display driver 208 are necessary in order to output the played-back image in the display device 105. The OS core section 204 is also necessary in order to use the basic functions provided by the OS.

Furthermore, the remote control application 218 and the network service 215 are necessary in order to provide a remote control function. Additionally, the network library 211 and a network driver 210 are necessary in order to communicate with an external device that carries out remote control. The OS core section 204 is also necessary in order to use the basic functions provided by the OS.

Based on this grouping, it can be seen that unique relationships exist between the software and functions run by the image capture apparatus 1. For example, the image capture application 216, the image capture service 213, and the sensor driver 205 are necessary only for the image capture function. Likewise, the playback application 217, the playback service 214, the display library 209, and the display driver 208 are necessary only for the playback function. The remote control application 218, the network service 215, the network library 211, and the network driver 210 are necessary only for the remote control function. The I/O library 212, the file system 207, and the secondary storage device driver 206 are necessary for both the image capture function and the playback function. The OS core section 204 is necessary for all of the functions.

In this embodiment, hibernation data for software required only by a given function, hibernation data for software required in common by some functions, and hibernation data for software required by all the functions are respectively generated. In other words, it is assumed that the hibernation data generated in this embodiment is used as a combination of a plurality of pieces of hibernation data. The minimum necessary hibernation data for providing the functions to be provided during startup is used in combination in the startup process. Accordingly, the time necessary for startup can be shortened, and as will be described, the functions provided during startup can be changed with ease.

Generation of Function-by-Function Hibernation Data

The process of generating hibernation data will be described further using FIGS. 7 to 10. The generation of hibernation data for making it possible to select functions to be provided during startup from the image capture function and the playback function will be described for the sake of simplicity, the hibernation data for making it possible to select other functions can be generated in the same manner.

Figure 7:
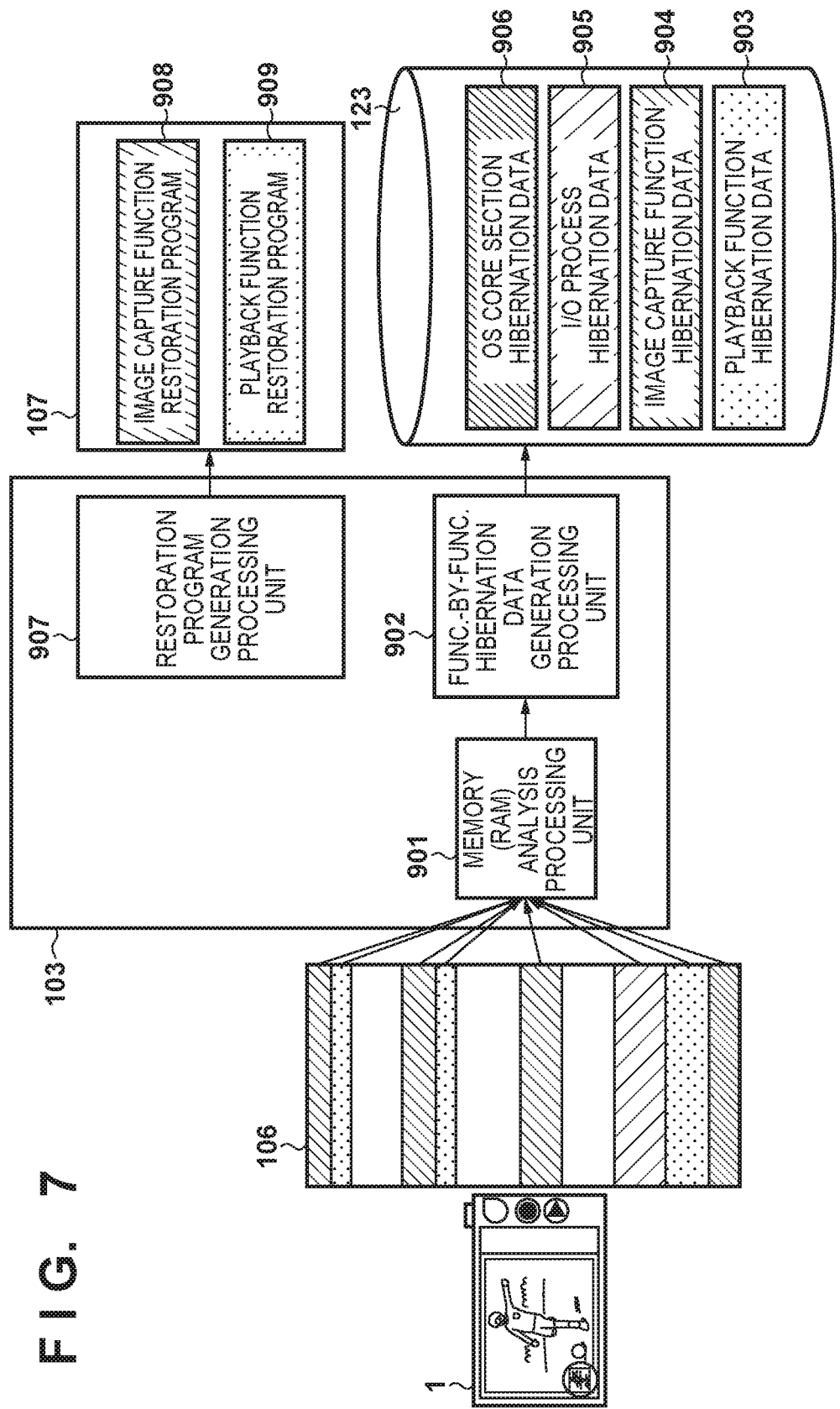
FIG. 7 is a schematic diagram illustrating function-by-function hibernation data generation processes.

FIG. 7 schematically illustrates a process for generating function-by-function hibernation data in the same manner as in FIG. 3A. Here, it is assumed that the image capture apparatus 1 has been started up and all of the software necessary to realize the image capture function and the playback function has been loaded into the RAM 106. For example, the state may be one in which the image capture apparatus 1 has been started up and then switched to a playback mode from the capture standby state.

A memory analysis processing unit 901 is executed by the CPU 103 using the OS core section 204, the image capture application 216, or the playback application 217. A function-by-function hibernation data generation processing unit 902 and a restoration program generation processing unit 907 are executed by the CPU 103 using the OS core section 204. The memory analysis processing unit 901 analyzes a correspondence relationship between a region of the RAM 106 being used and a function. The function-by-function hibernation data generation processing unit 902 generates function-by-function hibernation data and records that data in the HDD/SSD 123. The restoration program generation processing unit 907 generates function-by-function restoration programs and records those programs in the ROM 107.

Figure 8:
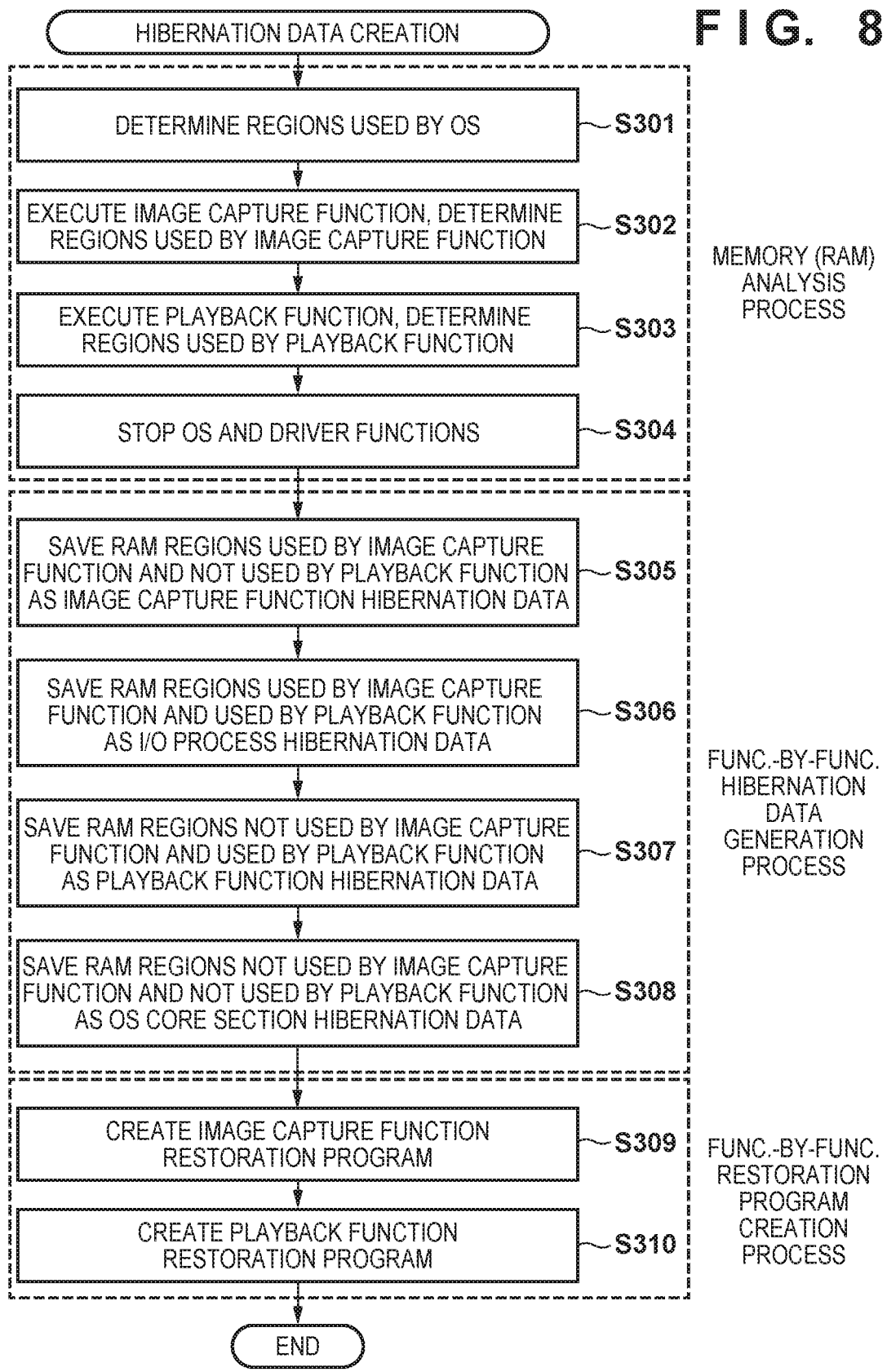
FIG. 8 is a flowchart illustrating function-by-function hibernation data generation processes.

The function-by-function hibernation data generation process will be described hereinafter using the flowchart in FIG. 8. Note that the hibernation data generation process may be executed during the process of manufacturing the image capture apparatus 1, or may be executed in response to a user instruction.

First, the hibernation data generation process as pertaining to the image capture function, I/O processing, and the OS core section will be described using FIG. 8.

In S301 to S303, the memory analysis processing unit 901 (the CPU 103) analyzes the used regions of the RAM.

In S301, the memory analysis processing unit 901 (the CPU 103) determines memory regions used by the OS core section 204 in the RAM 106. The regions used by the OS core section 204 may be determined by specifying addresses from known API symbol information provided by the OS core section 204, or by obtaining a profile by actually running the OS core section 204.

In S302, the image capture application 216 (the CPU 103) executes the image capture function, and as a result, a series of image capture operations (image capture preparation operations, image capture operations, and recording operations) is executed. Then, the memory analysis processing unit 901 determines memory regions of the RAM 106 used during the image capture operations and memory regions of the RAM 106 not used during the image capture operations.

After the image capture operations end, in S303, the playback application 217 (the CPU 103) executes the playback function, e.g. playback operations for a predetermined image file saved in the recording medium 110. While the playback operations are being executed, the memory analysis processing unit 901 determines regions of the RAM 106 used in the playback operations and regions of the RAM 106 not used in the playback operations.

Then, in S304, some of the functions of the OS and some driver functions are stopped.

Figure 9:
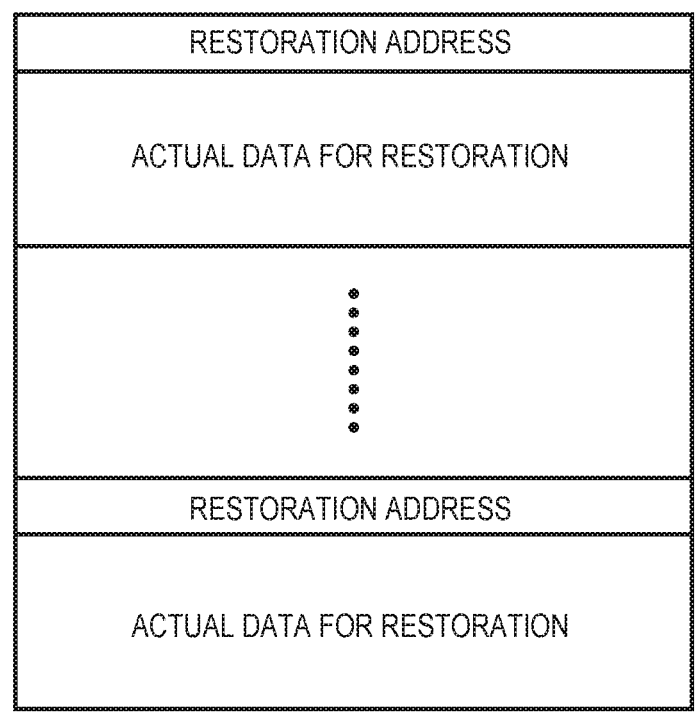
FIG. 9 is a diagram illustrating an example of the structure of function-by-function hibernation data.

Next, in S305 to S308, the function-by-function hibernation data generation processing unit 902 generates the function-by-function hibernation data in accordance with the results of the analysis carried out by the memory analysis processing unit 901 in S301 to S304. FIG. 9 is a diagram illustrating an example of the structure of the function-by-function hibernation data. The function-by-function hibernation data having such a structure is generated and then recorded into the HDD/SSD 123 as a data file. The basic structure of the function-by-function hibernation data is the same as that of the hibernation data illustrated in FIG. 5. However, unlike the hibernation data illustrated in FIG. 5, the function-by-function hibernation data according to this embodiment does not contain the CPU register information. The CPU register information is information used commonly by different instances of the function-by-function hibernation data. Accordingly, in this embodiment, it is assumed that the CPU register information is only held in the restoration program rather than in each instance of the hibernation data. However, each instance of hibernation data can include the CPU register information.

In S305, the function-by-function hibernation data generation processing unit 902 generates information of the memory regions of the RAM 106 used for the image capture function but not used for the playback function as image capture function hibernation data 904, and records that data in HDD/SSD 123. In S306, the function-by-function hibernation data generation processing unit 902 generates information of the memory regions of the RAM 106 used for both the image capture function and the playback function as I/O processing hibernation data 905, and records that data in HDD/SSD 123.

In S307, the function-by-function hibernation data generation processing unit 902 generates information of the memory regions of the RAM 106 not used for the image capture function but used for the playback function as playback function hibernation data 903, and records that data in HDD/SSD 123.

In S308, the function-by-function hibernation data generation processing unit 902 generates information of the memory regions of the RAM 106 used by neither the image capture function nor the playback function but used by the OS as OS core section hibernation data 906, and records that data into the HDD/SSD 123.

In S309 and S310, the restoration program generation processing unit 907 generates restoration programs for executing the startup process using the function-by-function hibernation data, and records those programs into the ROM 107.

The restoration program generation processing unit 907 generates a restoration program containing information for restoring the image capture function and the playback function, on a function-by-function basis.

In S309, an image capture function restoration program 908 (1200) is generated and recorded into the ROM 107, and in S310, a playback function restoration program 909 (1204) is generated and recorded into the ROM 107.

FIG. 10 schematically illustrates examples of the structure of the image capture function restoration program 1200 (908) and the structure of the playback function restoration program 1204 (909).

Each restoration program includes a main program part, information pertaining to a combination of the instances of hibernation data necessary to restore the function, information for identifying the hibernation data necessary for restoration, a restoration point of the function, and the CPU register information.

The image capture function restoration program 1200 includes a main program part 1201, image capture function restoration hibernation information 1202, and CPU register information 1203. The image capture function restoration hibernation information 1202 contains information pertaining to a combination of the necessary hibernation data (the OS core section, the image capture function, and the I/O processing). Additionally, information for identifying the hibernation data necessary to restore the image capture function, i.e. the OS core section hibernation data, image capture function hibernation data, and the I/O processing hibernation data, is also recorded in the image capture function restoration hibernation information 1202. The CPU register information 1203 contains information of the restore point for the image capture function. Likewise, the playback function restoration program 1204 includes a main program part 1205, playback function restoration hibernation information 1206, and CPU register information 1207 containing the restore point of the playback function.

Note that the format of the information specifying the hibernation data necessary to restore the function is not particularly limited; a name of the hibernation data may be used, or a number such as an ID may be used. File path information specifying a recording location in the HDD/SSD 123 may be recorded.

Note that the CPU register information and the restore point in the restoration program correspond to the function that the restoration program is to restore. Specifically, the image capture function restoration program includes the same image capture function restore point as that contained in the image capture function hibernation data. The playback function restoration program includes the same playback function restore point as that contained in the playback function hibernation data.

Image Capture Function Startup Process

Figure 11:
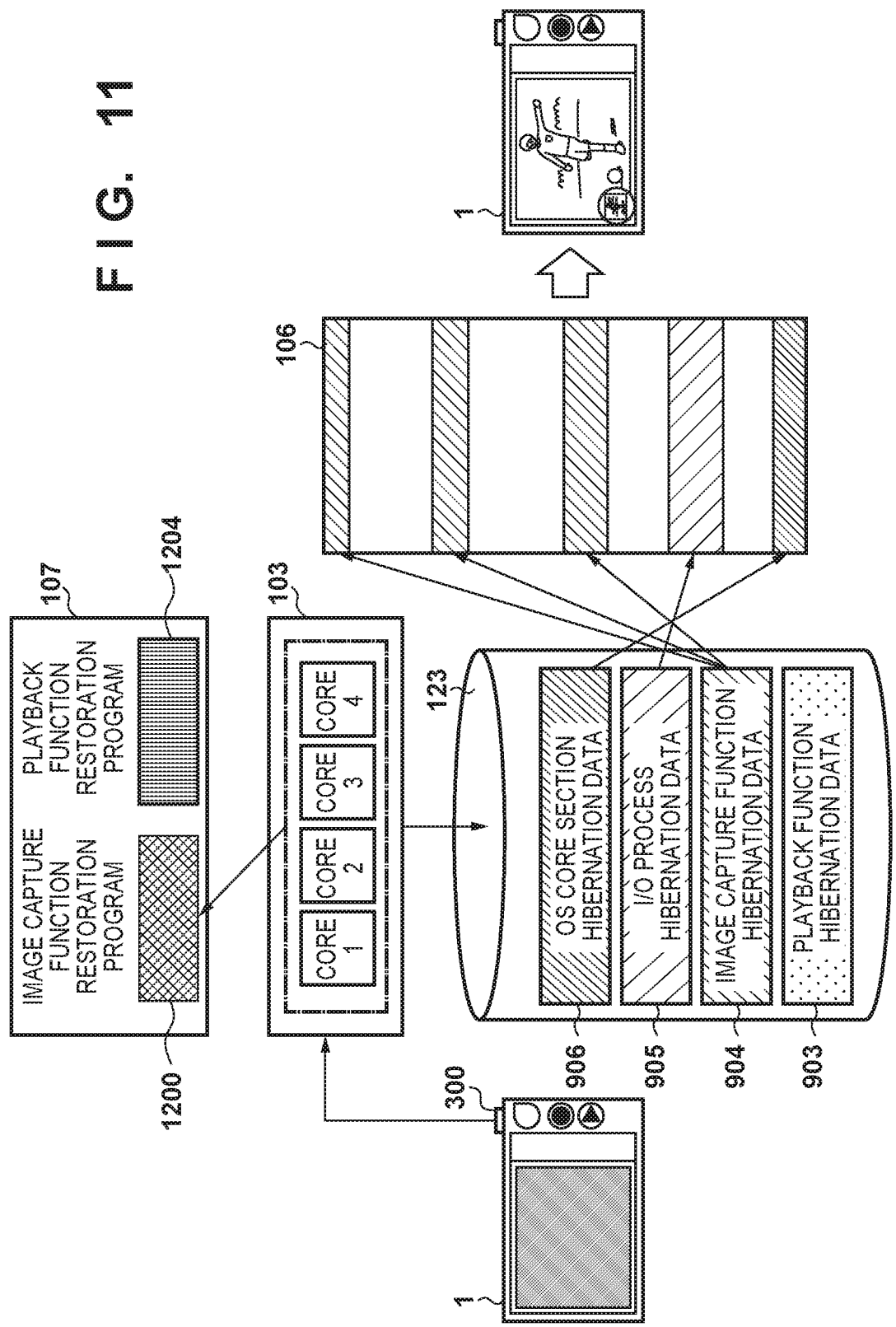
FIG. 11 is a schematic diagram illustrating an overview of a startup process of an image capture function.

Next, an image capture function startup process using the function-by-function hibernation data and the restoration program will be described using the schematic diagram illustrated in FIG. 11 and the flowchart illustrated in FIG. 12. Although the CPU 103 is illustrated as a quad-core CPU in FIG. 11, the number of cores in the CPU 103 is not particularly limited.

When, while the image capture apparatus 1 is powered off (or is in a suspended state), a startup instruction is issued in response to the power switch 300 being depressed or the like, a BIOS launches a boot loader (that is, the CPU 103 executes the boot loader). The image capture function startup process is started as a result.

When the power switch 300 of the image capture apparatus 1 is detected, it is assumed that the boot loader causes the CPU 103 to execute a program present at a power switch response address 1071 in the ROM 107, for example. If no program is present at the power switch response address 1071, the normal startup sequence as described with reference to S205 is started.

Assume here that the image capture function restoration program 1200 is present at the power switch response address 1071. Accordingly, when the power switch 300 is depressed while the image capture apparatus 1 is powered off, in S502, the CPU 103 executes the image capture function restoration program 1200 located at the power switch response address 1071 in the ROM 107. The image capture function restoration program 1200 initializes the minimum necessary hardware, such as the CPU 103 and the RAM 106.

In S503, the image capture function restoration program 1200 refers to its own image capture function restoration hibernation information 1202, and specifies the hibernation data necessary to restore the image capture function. The image capture function restoration program 1200 then obtains the specified hibernation data from the HDD/SSD 123, and loads the individual instances of hibernation data (actual data for restoration) into the RAM 106 in the locations indicated by the associated restoration address information.

Additionally, when the loading of the hibernation data into the RAM 106 is complete, in S504, the image capture function restoration program 1200 sets register settings of the CPU 103 and the restore point in the CPU 103 on the basis of the CPU register information 1203.

In S505, the image capture function restoration program 1200 jumps to the restore point and ends the restoration process. Startup is completed in a state in which the image capture function can be carried out according to the register settings in the RAM 106 and the CPU 103 through the above-described startup process. Accordingly, the startup sequence for the image capture function can be sped up using, for example, the power switch 300 being depressed as a trigger.

This embodiment describes a configuration in which the image capture function restoration program is located at an address, within the ROM 107, that is associated with a startup instruction operation. However, a program run in response to a startup instruction, such as the boot loader, may be provided with the same function as a power restoration program, and the configuration may be such that that function is executed in response to a startup instruction.

As described thus far, according to this embodiment, the startup process is carried out using the minimum hibernation data required by a specific function associated with a startup operation, and thus the amount of time until the startup is complete can be shortened.

Image Capture Function or Playback Function Startup Process

In the above-described image capture function startup process, the image capture function startup process is sped up by using the function-by-function hibernation data, but it is also possible to change the function provided at the time of startup by using the function-by-function hibernation data. Accordingly, the amount of time it takes until a desired function can be used can be shortened as compared to a case in which a separate operation for calling the desired function (e.g. operating a key or a button) is carried out after the startup is complete.

Figure 13:
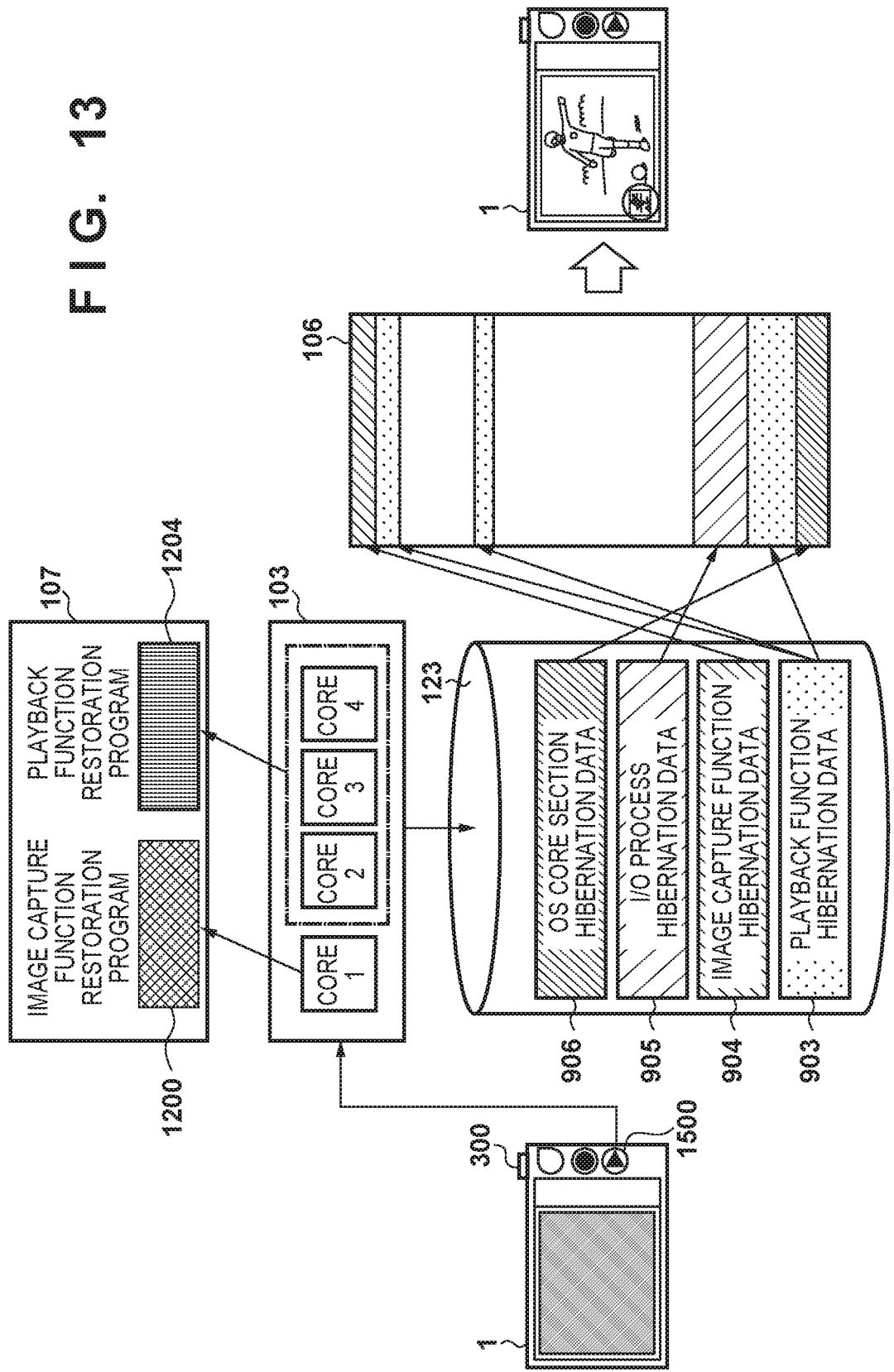
FIG. 13 is a schematic diagram illustrating an overview of a startup process of a playback function.
Figure 14:
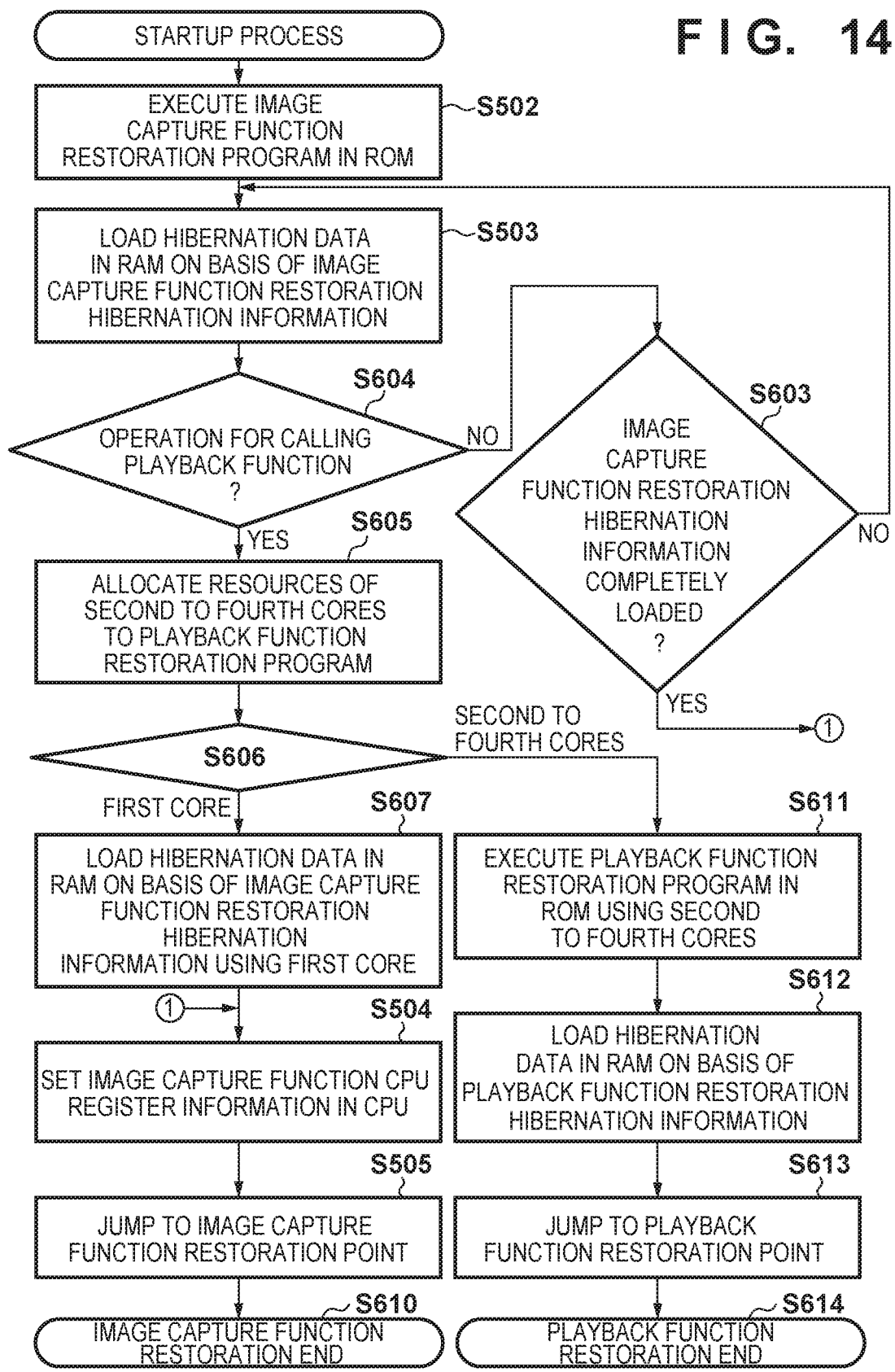
FIG. 14 is a flowchart pertaining to a startup process of an image capture function or a playback function.

In this embodiment, operations carried out in the case where an instruction for calling the playback function is input while the image capture function startup sequence is being executed in the startup process will be described using the schematic diagram illustrated in FIG. 13 and the flowchart illustrated in FIG. 14. In FIG. 14, processes that are the same as those in FIG. 12 have been given the same reference numerals as those in FIG. 12. The CPU 103 is assumed to be a quad-core CPU in this embodiment as well, but any number of cores greater than or equal to one may be used.

Upon the power switch 300 being depressed while the image capture apparatus 1 is turned off, a startup process for restoring the image capture function is started in the same manner as already described (S502). While the hibernation data is being loaded in S503, the OS core section 204 monitors an operation for calling the playback function (an interrupt) (S604). The operation for calling the playback function may be a playback button 1500 being depressed, for example. The OS core section 204 determines whether the loading of the image capture function hibernation data has ended (S603), and monitors the operation for calling the playback function (the interrupt) until the loading of the image capture function hibernation data has ended. If the loading of the image capture function hibernation data has ended without detecting the playback button 1500 being depressed (Yes in S603), the processing from S504 and onward is executed.

A playback button response address is assigned within the ROM 107, and the playback function restoration program 1204 is located at that address in advance. Upon detecting the playback button 1500 being depressed in S604, the OS core section 204 advances the processing to S605.

In S605, the OS core section 204 releases the resources of, for example, the second to fourth cores of the first to fourth cores in the CPU 103 from the image capture function restoration program 1200, allocates those resources to the playback function restoration program 1204, and starts the execution of the playback function restoration program 1204.

In S606, the OS core section 204 branches the processing between the processing carried out by the first core of the CPU 103 and the processing carried out by the second to fourth cores of the CPU 103.

The image capture function restoration program 1200, which is executed by the first core, continues the process of loading the hibernation data in S607. When the loading ends, in S504 and S505, the image capture function restoration program 1200 restores the register information and jumps to the restore point of the image capture function, and completes the startup process in a state in which the image capture function can be executed.

On the other hand, the playback function restoration program 1204, which is executed by the second to fourth cores, refers to its own playback function hibernation information 1206 in S611 and specifies the hibernation data necessary to restore the playback function. The playback function restoration program 1204 then obtains the specified hibernation data from the HDD/SSD 123, and loads the individual instances of hibernation data (memory contents) into the RAM 106 at the locations indicated by the associated restoration address information.

Additionally, when the loading of the hibernation data into the RAM 106 is complete, in S612, the playback function restoration program 1204 sets register content of the CPU 103 and the restore point in the CPU 103 on the basis of the CPU register information 1207.

In S613, the playback function restoration program 1204 jumps to the playback function restore point and ends the restoration process. The startup process is completed in a state in which the playback function can be executed as a result.

With respect to hibernation data for the restoration by both the image capture function restoration program 1200 and the playback function restoration program 1204, the program that is loaded and processed later may be overwritten into the same memory region. Alternatively, the program may be determined to be already loaded, and the loading process may be skipped.

In this embodiment, a greater amount of processing resources (CPU cores, here) are allocated to a second startup process carried out by the restoration program whose execution is started later, than to a first startup process carried out by the restoration program whose execution has been started in response to a startup instruction. This makes it possible to preferentially execute the restoration program whose execution is started later (that is, the second startup process). However, if the execution of the second startup process is started while the first startup process is being executed, the first startup process may be stopped while the second startup process is being executed, and all processing resources may be allocated to the second startup process. In this case, the execution of the first startup process, which was stopped, is restarted after the execution of the second startup process is complete.

In either case, the user can quickly start up the image capture apparatus and put the apparatus into a state in which the playback function can be used immediately by depressing the playback button after depressing the power switch.

Variations on Embodiments

In the embodiments, a startup instruction can be input by an external device communicating with the image capture apparatus 1, rather than operating the image capture apparatus 1. The communication processor 150 and the communication circuit 151 of the image capture apparatus 1 are used in this embodiment.

FIG. 15 schematically illustrates a state in which the image capture apparatus 1 has joined a wireless communication network formed by a wireless access point 1800 using the communication circuit 151, and can communicate with an information terminal 1801 that has also joined that wireless communication network. FIG. 15 assumes a wireless communication network (e.g. a wireless LAN) formed by the wireless access point 1800 as an example. However, a communication network based on any desired standard, including hard-wired networks, can be used as long as the network enables the image capture apparatus 1 to communicatively connect to the information terminal 1801. The information terminal 1801 may be a mobile device such as a smartphone, a tablet terminal, a laptop computer, or a portable game console, or may be a stationary terminal such as a desktop computer.

Additionally, as described above, standby power is supplied to the communication processor 150 and the communication circuit 151 even while the image capture apparatus 1 is turned off, and thus the communication circuit 151 can communicate with the external device.

The information terminal 1801 is provided with a user interface (UI) 1802 that instructs image capturing and a UI 1803 that instructs playback, regardless of the communication standard of the network. In the example illustrated in FIG. 15, the UIs 1802 and 1803 are graphical user interfaces (GUIs), and FIG. 15 schematically illustrates a state in which the UIs are displayed in a touch display. However, hardware buttons, switches, keys, and so on may be assigned to issue capture instructions, playback instructions, and so on. In FIG. 15, an image capturing start packet 1804 is issued from the information terminal 1801 to the image capture apparatus 1 in response to the UI 1802 being operated. When the communication circuit 151 of the image capture apparatus 1 receives this image capturing start packet 1804, the communication processor 150 treats the reception as a startup instruction being input, and turns the image capture apparatus 1 on.

Figure 16:
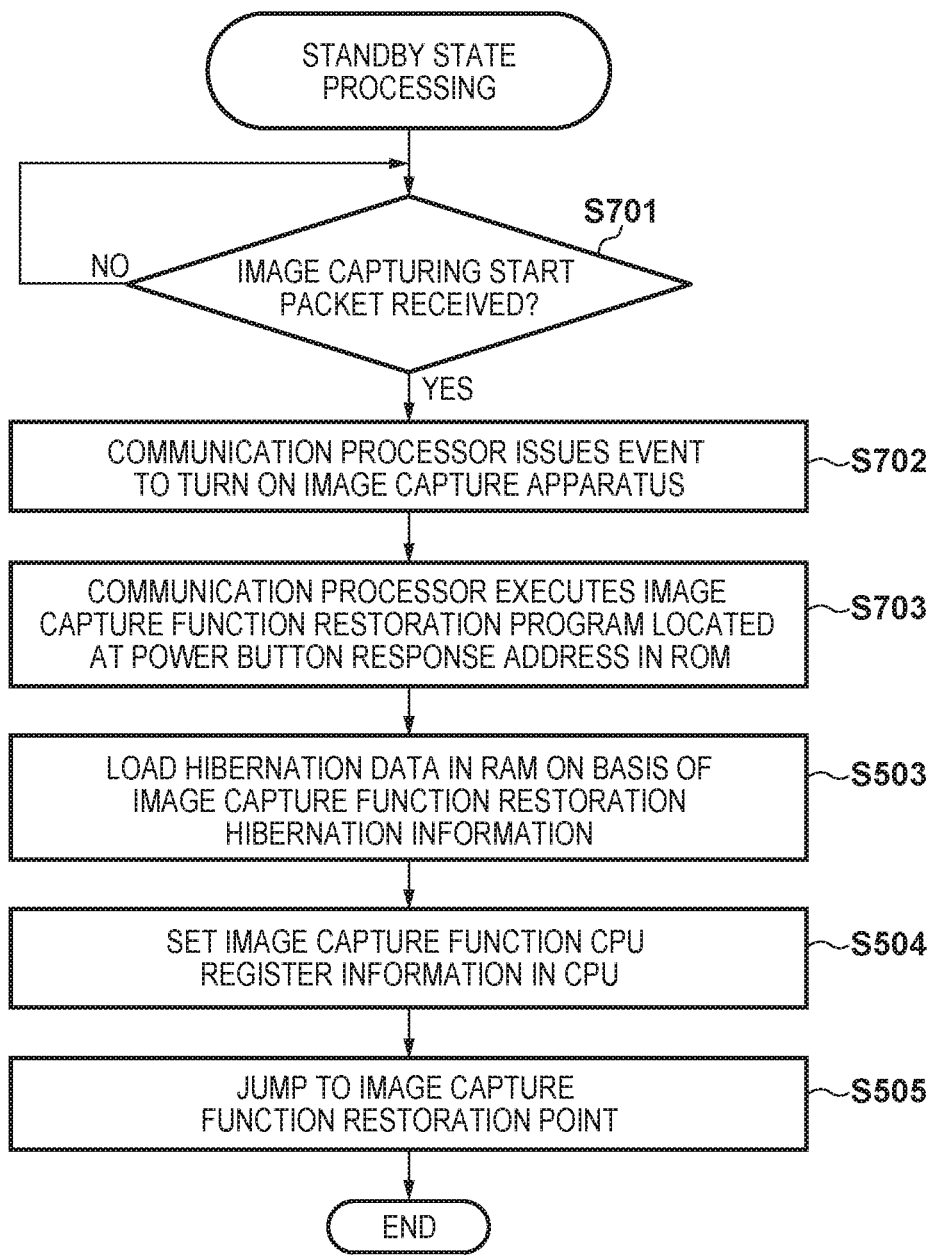
FIG. 16 is a flowchart pertaining to a startup process according to the variation on the embodiment.

FIG. 16 is a flowchart pertaining to operations carried out when the image capture apparatus 1 is in a standby state where communication with the external device is possible.

In the standby state, the main power of the image capture apparatus 1 is off, and only the communication circuit 151 and the communication processor 150 are operating under standby power. In this state, when the communication circuit 151 receives a packet, the communication processor 150 executes a process for determining whether or not the packet is the image capturing start packet 1804 (S701).

When a remote control application running on the information terminal 1801 is operated through the UI 1802, the image capturing start packet 1804 is sent to the image capture apparatus 1 from the information terminal 1801. It is assumed that information such as an address of the image capture apparatus 1 (the communication circuit 151) is registered in the information terminal 1801 in advance.

Upon the reception of the image capturing start packet 1804 being detected in S701, in S702, the communication processor 150 issues the same type of power-on event as that arising in the case where the power switch 300 has been operated, and transitions the image capture apparatus 1 to a startup state. Then, in S703, the communication processor 150 starts the execution of the image capture function restoration program 1200 located at the power switch response address 1071 in the ROM 107. The image capture function restoration program 1200 may be executed by the CPU 103 that has been started up.

Figure 12:
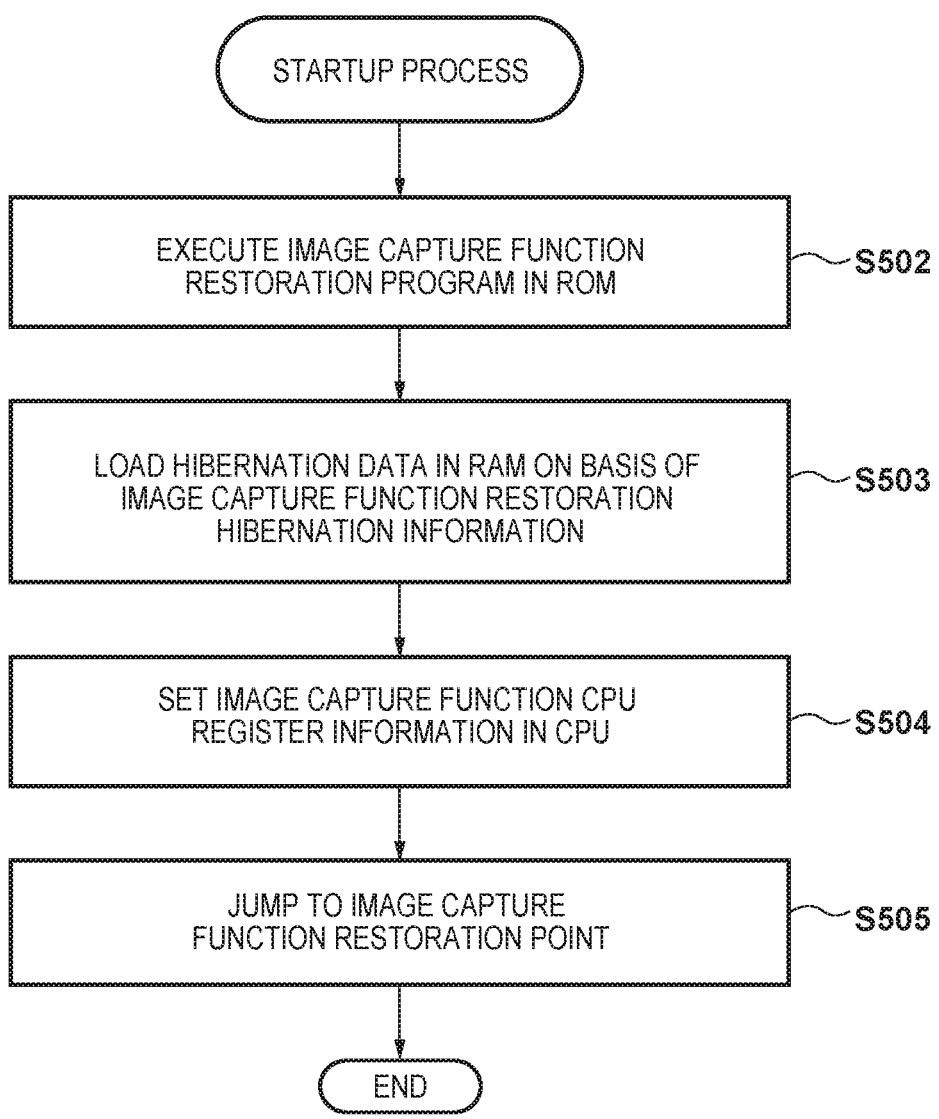
FIG. 12 is a flowchart pertaining to a startup process.

The startup process described using FIG. 12 is executed thereafter (S503 to S505). Note that if the playback button 1500 has been depressed, the communication circuit 151 has received a playback start packet issued in response to the user interface 1803 being operated, or the like while the image capture function restoration program 1200 is being executed, the processing described above according to FIGS. 13 and 14 may be executed.

In this manner, according to this variation, the processing described in the embodiments can be executed remotely from an external device.

Other Embodiments

The foregoing embodiments have described a configuration in which an electronic device that starts up using hibernation data has a function for generating the hibernation data. However, if the configuration is such that hibernation data stored in the electronic device in advance is used, the function for generating the hibernation data need not be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-030248 filed on Feb. 21, 2017, No. 2017-245394 filed on Dec. 21, 2017, and No. 2018-007591 filed on Jan. 19, 2018 which are hereby incorporated by reference herein in their entirety.

What is claimed is:

1. An electronic device comprising:
a storage device that stores hibernation data including information for restoring a status of the electronic device at a time when the electronic device was in operation; and
a processor that executes programs stored in a memory and thereby functions as a control unit configured to execute a first startup process using the hibernation data in response to an input of a startup instruction being detected,
wherein the storage device stores a plurality of pieces of hibernation data that can be used in combination with each other; and
the control unit executes the first startup process using a combination of a plurality of pieces of hibernation data necessary to restore the electronic device to a status of providing a specific function associated with the startup instruction,
wherein the electronic device has an image capture function; and
the plurality of pieces of hibernation data stored in the storage device includes hibernation data corresponding only to the image capture function, hibernation data corresponding only to a playback function, and hibernation data common to both the image capture function and the playback function.

2. The electronic device according to claim 1,
wherein the storage device stores one or more pieces of hibernation data common for a plurality of functions and one or more pieces of hibernation data corresponding to only one function; and
the control unit executes the first, startup process using a combination of one or more pieces of hibernation data corresponding to only the specific function and one or more pieces of hibernation data common for a plurality of functions.

3. The electronic device according to claim 1,
wherein in the case where an instruction associated with a function requiring hibernation data not used in the first startup process has been detected while the first startup process is being executed, the control unit starts executing a second startup process using a combination of a plurality of pieces of hibernation data necessary to restore the electronic device to a status of providing the function.

4. The electronic device according to claim 3,
wherein the control unit executes the second startup process with priority over the first startup process.

5. The electronic device according to claim 3,
wherein the control unit stops the first startup process while the second startup process is being executed.

6. The electronic device according to claim 1,
wherein the startup instruction is input through controls included in the electronic device.

7. The electronic device according to claim 1,
wherein the startup instruction is input from a device external to the electronic device.

8. The electronic device according to claim 1,
wherein the first startup process is for restoring the electronic device to a status of providing the image capture function.

9. The electronic device according to claim 1, wherein the processor further functions as:
a generating unit configured to generate the plurality of pieces of hibernation data.

10. A method of controlling an electronic device, the electronic device including a storage unit that stores a plurality pieces of hibernation data, each of which including information for restoring a status of the electronic device at a time when the electronic device was in operation, the method comprising:
executing a first startup process using one or more pieces of the hibernation data in response to an input of a startup instruction being detected,
wherein the plurality of pieces of hibernation data can be used in different combinations; and
in the executing, the first startup process is executed using a combination of a plurality of pieces of the hibernation data that are necessary to restore the electronic device to a status of providing a specific function associated with the startup instruction,
wherein the electronic device has an image capture function; and
the plurality of pieces of hibernation data stored in the storage unit includes hibernation data corresponding only to the image capture function, hibernation data corresponding only to a playback function, and hibernation data common to both the image capture function and the playback function.

11. A non-transitory computer-readable medium storing a program that causes, when executed by a computer included in an electronic device that has a storage unit storing a plurality pieces of hibernation data, each of which including information for restoring a status of the electronic device at a time when the electronic device was in operation, the computer to perform a method comprising:
executing a first startup process using one or more pieces of the hibernation data in response to an input of a startup instruction being detected,
wherein the plurality of pieces of hibernation data can be used in different combinations; and
in the executing, the first startup process is executed using a combination of a plurality of pieces of the hibernation data that are necessary to restore the electronic device to a status of providing a specific function associated with the startup instruction,
wherein the electronic device has an image capture function; and
the plurality of pieces of hibernation data stored in the storage unit includes hibernation data corresponding only to the image capture function, hibernation data corresponding only to a playback function, and hibernation data common to both the image capture function and the playback function.

* * * * *